(12) United States Patent
Klein

(10) Patent No.: US 7,533,522 B2
(45) Date of Patent: May 19, 2009

(54) METHOD AND APPARATUS FOR ADDING A REACTANT TO AN EXHAUST GAS FROM AN INTERNAL COMBUSTION ENGINE

(75) Inventor: Ulf Klein, Neunkirchen-Seelschied (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 81 days.

(21) Appl. No.: 11/504,749

(22) Filed: Aug. 15, 2006

(65) Prior Publication Data

US 2007/0051097 A1    Mar. 8, 2007

(30) Foreign Application Priority Data

Sep. 2, 2005    (DE) .................. 10 2005 041 841

(51) Int. Cl.
*F01N 3/00* (2006.01)

(52) U.S. Cl. .................. 60/286; 60/274; 60/303
(58) Field of Classification Search .................. 60/274, 60/286, 303
See application file for complete search history.

(56) References Cited

U.S. PATENT DOCUMENTS

2006/0283181 A1* 12/2006 Crawley et al. ............... 60/303

FOREIGN PATENT DOCUMENTS

| DE | 38 35 939 A1 | 5/1989 |
|---|---|---|
| DE | 199 13 462 A1 | 9/2000 |
| DE | 102 01 042 A1 | 8/2003 |
| EP | 1 022 048 A1 | 7/2000 |
| JP | 56-85516 A | 7/1981 |
| JP | 11-166410 A | 6/1999 |
| WO | WO 00/12879 | 3/2000 |
| WO | WO 03/036054 A1 | 5/2003 |

OTHER PUBLICATIONS

European Search Report dated Jun. 23, 2008.

* cited by examiner

*Primary Examiner*—Tu M. Nguyen
*Assistant Examiner*—Diem Tran
(74) *Attorney, Agent, or Firm*—Laurence A. Greenberg; Werner H. Stemer; Ralph E. Locher

(57) ABSTRACT

A method and apparatus for adding a reactant to an exhaust gas from an internal combustion engine is based on the principle of dividing the exhaust gas stream into an inner exhaust gas flow and an outer exhaust gas flow, which radially surrounds the inner exhaust gas flow. A swirl is imparted to the outer exhaust gas flow and then the reactant is added to the inner exhaust gas flow. The method and apparatus advantageously enable the reactant, in particular a reducing agent precursor and/or a reducing agent, preferably urea, in particular in aqueous solution, to be introduced into the exhaust system of the internal combustion engine without the formation of undesirable by-products, such as for example biuret, as a result of contact between the reactant and the usually relatively cool outer tubular casing of the apparatus.

8 Claims, 2 Drawing Sheets

FIG.3
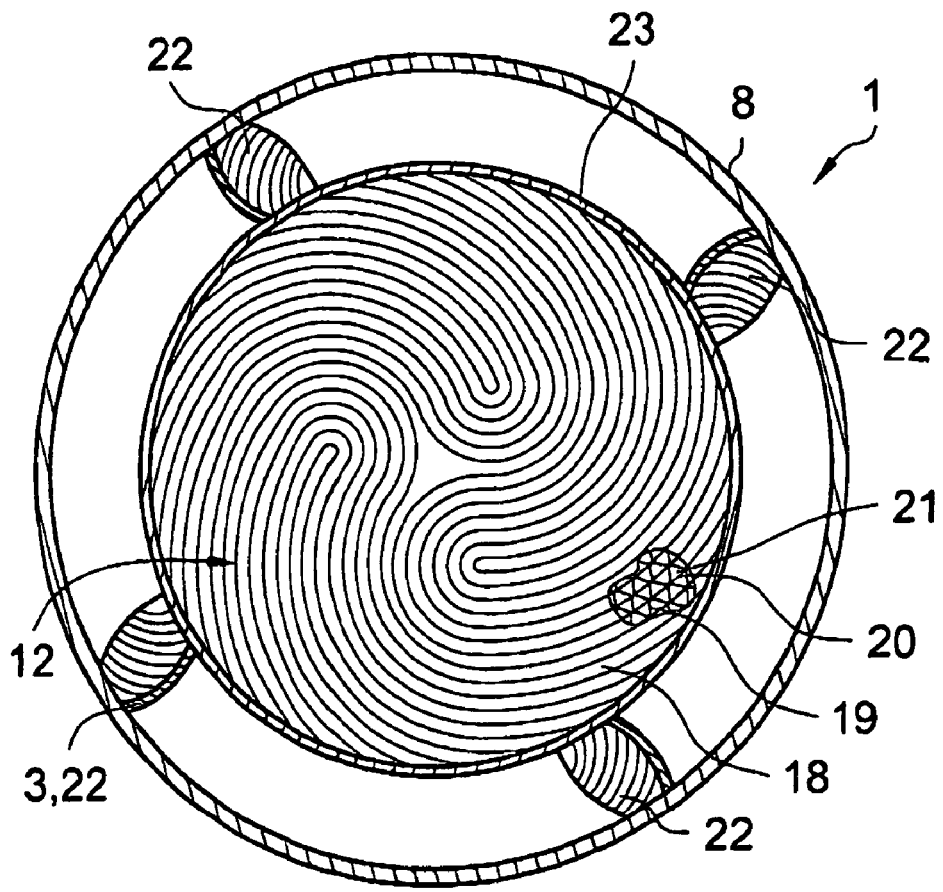
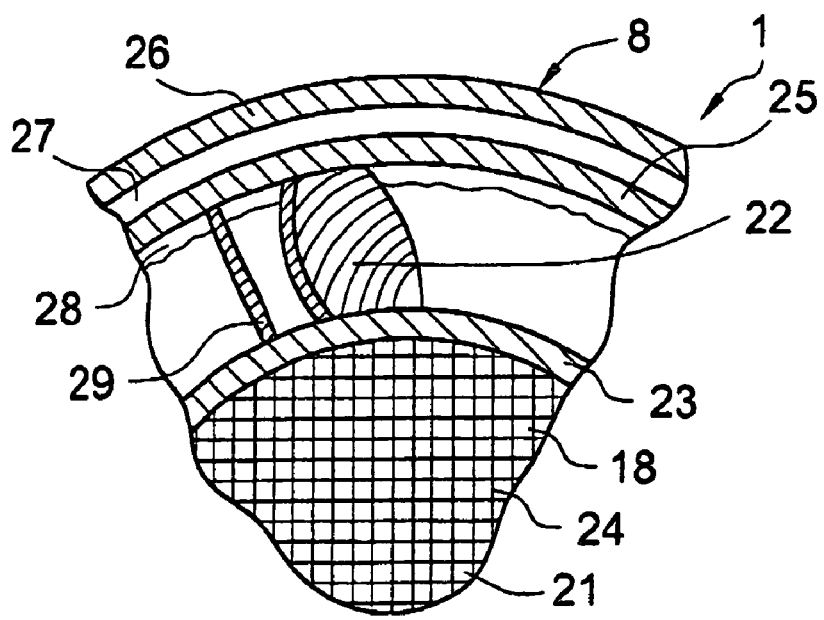
FIG.4

METHOD AND APPARATUS FOR ADDING A REACTANT TO AN EXHAUST GAS FROM AN INTERNAL COMBUSTION ENGINE

BACKGROUND OF THE INVENTION

Field of the Invention

The invention relates to a method and an apparatus for adding a reactant to an exhaust gas from an internal combustion engine. The method and apparatus according to the invention are particularly suitable for adding a reducing agent and/or a reducing agent precursor, such as for example urea, to the exhaust system of the internal combustion engine. The method and apparatus according to the invention are preferably used in exhaust systems of automobiles.

Many countries throughout the world have implemented statutory regulations which set an upper limit value for the content of certain undesirable substances in the exhaust gas from internal combustion engines. These are generally substances which are undesirable to be release to the environment. Nitrogen oxides ($NO_x$) represent one example of such substances. In many countries, the level of nitrogen oxides in the exhaust gas must be below statutory limit values. On account of the relatively low statutory limit values, engine-internal measures for reducing the nitrogen oxide emissions are of only limited use for complying with the limit values; an exhaust gas aftertreatment aimed at nitrogen oxides is often required. It has in this context emerged that selective catalytic reduction (SCR) of the nitrogen oxides is advantageous. The SCR method, as it is known, requires a reducing agent which contains nitrogen. The use of ammonia ($NH_3$) as the reducing agent has proven to be one possible alternative. On account of the chemical properties and statutory stipulations in many countries, ammonia is not usually held in the form of pure ammonia, since this can lead to problems in particular in mobile applications. Rather, instead of storing the reducing agents themselves, it is often reducing agent precursors which are stored and carried along in mobile applications.

In this context, a reducing agent precursor is to be understood in particular as meaning a substance which releases the reducing agent and/or can be chemically converted into the reducing agent. By way of example, urea represents a reducing agent precursor for the reducing agent ammonia. Other possible reducing agent precursors for ammonia as the reducing agent include, for example, ammonium carbamate, isocyanic acid and cyanuric acid.

All reducing agents or reducing agent precursors can be converted or decompose into undesirable reaction products. Whether, and if so to what extent, conversion or decomposition to undesirable by-products takes place depends on the conditions in the exhaust system. In this context, the temperature to which the reactants are exposed is a particularly important factor. If a reducing agent and/or a reducing agent precursor is added to the exhaust gas from an internal combustion engine, a shift in the reaction equilibrium toward undesirable by-products may occur in cooler regions of the exhaust system. In particular if urea is added as the reducing agent precursor for the reducing agent ammonia, for example in aqueous solution, the urea ($NH_2$—CO—$NH_2$) can react, inter alia, to form biuret ($NH_2$—CO—NH—CO—$NH_2$), with ammonia ($NH_3$) being released. Biuret and other undesirable by-products constitute a plastic compound which can lead to the corresponding regions of the exhaust system sticking. Conversion into biuret and precipitation on the walls of the exhaust system can occur in particular if the wall of the exhaust system is relatively cool.

SUMMARY OF THE INVENTION

It is accordingly an object of the invention to provide a method and an apparatus for adding a reactant to an exhaust gas from an internal combustion engine which overcome the above-mentioned disadvantages of the prior art devices and methods of this general type, in which the formation of undesirable by-products at the wall of the exhaust system is reduced.

In a method according to the invention for adding a reactant to an exhaust gas from an internal combustion engine, an exhaust gas stream is divided into an inner exhaust gas flow and an outer exhaust gas flow, which radially surrounds the inner exhaust gas flow. A swirl is imparted to the outer exhaust gas flow and then the reactant is added to the inner exhaust gas flow.

In this context, a swirl or a swirling flow is to be understood in particular as meaning a flow which, in addition to an overall translational velocity component also has an overall rotational velocity component. In the method according to the invention, the formation of a swirling flow in the outer exhaust gas flow leads to a reduced probability of the reactant coming into contact with a wall which radially delimits the exhaust gas flow, or even in this risk being substantially eliminated, since the swirling flow forms a type of insulation for the inner exhaust gas flow. As a result, mixing of the inner exhaust gas flow with the outer exhaust gas flow is substantially prevented, or is at any rate so slight that the inner exhaust gas flow carrying the reactant cannot come into contact with the wall of the exhaust system to a significant extent.

According to an advantageous refinement of the method according to the invention, the inner exhaust gas flow is laminarized.

The laminarization of a flow is to be understood in particular as meaning a reduction in the Reynolds number of the flow. The Reynolds number can particularly advantageously be reduced to below a critical Reynolds number, above which the inner exhaust gas flow is turbulent and/or quasi-laminar in form.

According to a further advantageous configuration of the method according to the invention, the imparted swirl is adapted as a function of at least one of the following variables:

a) the exhaust gas temperature, b) the exhaust gas pressure, c) the exhaust gas mass flow, and d) the quantity of reactant with respect to at least one of the following variables:

a1) a rotational velocity component of the outer exhaust gas flow, and b1) a translational velocity component of the outer exhaust gas flow.

Therefore, in particular, the rotational velocity of the swirling flow or of the outer exhaust gas flow in accordance with a1) changes, in particular is generated and/or increased, and/or in accordance with b1) the mean translational flow velocity of the outer exhaust gas flow or the swirling flow is altered. For example, it is possible to increase the rotational velocity component of the swirl or the outer exhaust gas flow as the exhaust gas temperature and/or exhaust gas pressure rises, in order in this way to achieve significantly better insulation of the inner exhaust gas flow with respect to an outer wall. The variable d) is preferably to be understood as meaning the quantity of reactant which is to be kept away from the wall by the swirling flow.

According to another advantageous configuration of the method according to the invention, the reactant contains at least one of the following substances:

a reducing agent,
a reducing agent precursor, and
an oxidizing agent.

In particular, these are reducing agents or reducing agent precursors which are used as part of selective catalytic reduction of nitrogen oxides. Therefore, it is preferably possible to use a method for selective catalytic reduction in which a reactant is added to an exhaust gas from an internal combustion engine, wherein an exhaust gas stream is divided into an inner exhaust gas flow and an outer exhaust gas flow which radially surrounds the inner exhaust gas flow, a swirl being imparted to the outer exhaust gas flow and then the reactant being added to the inner exhaust gas flow. The reactant contains at least one of a reducing agent, and a reducing agent precursor.

In this context, it is preferably possible to add nitrogen-containing reducing agents and/or precursors thereof, particularly preferably urea, in particular in aqueous solution.

An oxidizing agent may, for example, contain hydrocarbons, which may in particular also originate from the fuel of the internal combustion engine. In particular, the oxidizing agent can be used to regenerate a storage element, in particular a storage element for storing nitrogen oxides ($NO_x$).

According to a further advantageous configuration of the method according to the invention, the reactant contains at least one of the following substances:

a2) ammonia ($NH_3$),
b2) urea,
c2) ammonium formate,
d2) ammonium carbamate,
e2) isocyanic acid,
f2) cyanuric acid, and
g2) hydrocarbons.

Ammonium formate constitutes the corresponding salt of formic acid. Ammonium formate can advantageously be used in particular for aqueous urea solutions to reduce the freezing point of this solution. A corresponding urea solution which contains ammonium formate is available under the trade name "Denoxium". Substances b2), d2), e2) and f2) constitute reducing agent precursors for the reducing agent ammonia. It is in this context preferable to use urea, since a logistics network for topping up mobile users with a solution of this type has already been constructed in some countries specifically for aqueous urea solutions. Hydrocarbons can in particular also be used for the regeneration of storage elements, such as for example storage elements for nitrogen oxides ($NO_x$).

A further aspect of the present invention proposes an apparatus for adding a reactant to an exhaust gas from an internal combustion engine, the exhaust gas flowing in a direction of flow. The apparatus has a device for imparting a swirl to an outer exhaust gas flow, which radially surrounds an inner exhaust gas flow, and an addition device for adding the reactant to the inner exhaust gas flow being formed downstream of the device for imparting the swirl, as seen in the direction of flow.

The apparatus according to the invention advantageously makes use of the fact that the swirling flow in the outer exhaust gas flow can be used as a form of insulation for the inner exhaust gas flow, so that contact between the reactant and a tube or tubular casing which radially delimits the apparatus on the outer side is avoided as far as possible. When the reactant comes into contact with the wall, which is generally significantly cooler, undesirable by-products may form. Therefore, the formation of these by-products is effectively avoided.

The tubular casing may advantageously be heatable at least in partial regions, for example by an electrical resistance heater. Heating of the exhaust gas stream for example by an electrically heatable honeycomb body is also possible as an alternative and/or in addition.

In accordance with a further advantageous configuration of the apparatus according to the invention, the device for imparting a swirl contains at least one guide vane.

This may in particular be a guide vane made from a material that is resistant to high-temperature corrosion, in particular special steel. It is fundamentally preferable for the device for imparting the swirl to be formed from material which is resistant to high temperature corrosion and can withstand the conditions in exhaust systems of internal combustion engines.

According to another advantageous configuration of the apparatus according to the invention, the at least one guide vane is elastic.

Forming an elastic guide vane allows adaptation to the deflection and/or curvature of the guide vane as a function of exhaust gas parameters, such as for example the exhaust gas mass flow and/or the exhaust gas pressure. The higher the exhaust gas pressure, the more the guide vane is deformed. The guide vane is preferably formed in such a way that even at maximum exhaust gas pressures and/or temperatures the deformation of the guide vane remains in the elastic range. The guide vane may preferably be formed from corrosion-resistant material, in particular from a suitably configured special steel.

According to a further advantageous configuration of the apparatus according to the invention, the at least one guide vane is formed in such a way that at least one of the following variables a) a deflection of the guide vane, and
b) a curvature of the guide vane can be altered as a function of a change in at least one of the following variables:
the exhaust gas temperature,
the exhaust gas mass flow, and
the exhaust gas pressure.

Forming the guide vane in this way advantageously allows the swirling flow to be adapted to the conditions in the outer exhaust gas flow. The swirling flow can in this way be adapted to the situation in the exhaust system.

According to another preferred configuration of the apparatus according to the invention, the at least one guide vane is at least partially formed from a bimetal.

In this context, a bimetal is to be understood in particular as meaning a composite material made up of two metallic materials which differ in terms of their thermal expansion and in particular their coefficient of thermal expansion. The difference in the coefficient of thermal expansion leads to the bimetal guide vane being deformed, in particular bending, when it is heated.

In particular a change in the curvature of the guide vane as a function of the exhaust gas temperature can advantageously be achieved in this way.

According to a further advantageous configuration of the apparatus according to the invention, the device for imparting a swirl contains at least one winding passage.

It is in this context preferable to form a helical passage in the region in which the outer exhaust gas flow is generated and/or guided. It is in this context particularly preferable for the at least one winding passage to be delimited by at least one wall, which is elastically deformable at least in partial regions.

On account of the wall being elastically deformable in this way, it is possible to adapt the swirling flow to the situation in the exhaust gas, in particular to the exhaust gas pressure.

According to another preferred configuration of the apparatus according to the invention, the at least one wall is formed in such a way that its curvature can be altered as a function of a change in at least one of the following variables:

the exhaust gas temperature, the exhaust gas mass flow, and the exhaust gas pressure.

A change in the curvature in the wall of the winding passage can be used in particular to effect a change in the rotational velocity component of the swirl. The wall may be formed from a bimetal, so that the curvature of the wall can be adapted to the exhaust gas temperature in a simple way.

According to another advantageous configuration of the apparatus according to the invention, the wall is formed from a bimetal at least in partial regions.

According to another advantageous configuration, a laminarization device for laminarizing the inner exhaust gas flow is formed upstream of the addition device.

The term laminarization is to be understood in particular as meaning a reduction in the Reynolds number of the inner exhaust gas flow. The laminarization device may in particular contain a honeycomb body which includes passages. A honeycomb body of this type may be formed either as a ceramic honeycomb body or as a metallic honeycomb body containing at least one at least partially structured metallic layer and if appropriate at least one substantially smooth metallic layer. The smoother the passage walls, the more effective the laminarization. Therefore, a honeycomb body which does not have any apertures or guide vanes in the passage walls and in particular also does not have any coating of the walls of the passages is a particularly preferred laminarization device.

This advantageous configuration makes use of the fact that laminar flows from a honeycomb body, after they have left the honeycomb body, retain their laminar property over a very long flow path. Therefore, adding the reactant to the inner exhaust gas flow ensures that the reactant does not pass into the swirling flow and therefore also does not pass onto a tube which delimits the apparatus on the outer side, or a corresponding wall.

The apparatus according to the invention may preferably be formed in such a way that the device for imparting the swirl to the outer exhaust gas flow is formed radially outside the laminarization device for laminarizing the inner exhaust gas flow.

According to an advantageous configuration of the apparatus according to the invention, the laminarization device contains a honeycomb body with passages through which a fluid can flow in the direction of flow.

According to a further advantageous configuration, these passages are barrier-free. The term barrier-free is to be understood in particular as meaning that the walls of the passages do not have any microstructures, apertures and/or guide vanes, and in particular also do not have a coating.

According to a further advantageous configuration of the apparatus according to the invention, the device for imparting the swirl is formed radially outside the honeycomb body.

This allows a compact structure of the apparatus according to the invention.

According to a further advantageous configuration of the apparatus according to the invention, at least one first tubular casing is formed radially outside the device for imparting a swirl.

The first tubular casing therefore serves as an outer housing of the apparatus according to the invention.

According to a further advantageous configuration of the apparatus according to the invention, an outer first tubular casing and an inner first tubular casing, which are separated by a gap, are formed outside the device for imparting the swirl.

Forming an outer first tubular casing and an inner first tubular casing outside the device for imparting the swirl has the effect of the inner first tubular casing being thermally insulated from the outer first tubular casing by the gap. As a result, the inner first tubular casing can be heated up more quickly, so that as a result the formation of undesirable by-products is reduced. The gap in this case acts as a type of air gap insulation.

According to a further advantageous configuration of the apparatus according to the invention, the at least one first tubular casing is provided at least in partial regions of the interior with a catalytically active coating which is suitable for converting the reactant.

In this context, the term in the interior, means in particular that the coating is formed on that side of the tubular casing which faces the device for imparting the swirl. The conversion is in particular a thermolysis, pyrolysis and/or hydrolysis, in particular if a reducing agent precursor is added as the reactant.

According to a further advantageous configuration of the apparatus according to the invention, a second tubular casing, which is formed with measures for shifting the resonant frequency of the second tubular casing, is formed between the device for imparting the swirl and the honeycomb body.

It is often advantageous to form a second tubular casing around the honeycomb body, which serves in particular as a laminarization device, in order to provide the honeycomb body with the required stability. However, if the mass of the tubular casing or of the tubular casing with honeycomb body is significantly greater than the mass of the device for imparting the swirl, the resonant frequency of the tubular casing or of the tubular casing with honeycomb body may be in a critical range which is reached at standard frequencies in the exhaust system of an internal combustion engine, with the result that the apparatus according to the invention could be damaged by resonance phenomenon. It is therefore advantageous to form devices for shifting the resonant frequency. These may in particular contain a supporting device which supports the second tubular casing on the at least one first tubular casing. Supporting the second tubular casing on the first tubular casing leads to a significant shift in the resonant frequency, so that a resonance catastrophe can be effectively prevented.

It is in this context particularly preferable for the supporting device to at least partially form the device for imparting the swirl. For example, a guide vane suitably connected to the second tubular casing or a wall of a helical passage may advantageously be formed as the supporting device.

The details and advantages which have been disclosed for the method according to the invention can be transferred and applied in the same way to the apparatus according to the invention. The details and advantages which have been disclosed for the apparatus according to the invention can be transferred and applied in the same way to the method according to the invention. The apparatus according to the invention is particularly suitable for carrying out the method according to the invention.

Other features which are considered as characteristic for the invention are set forth in the appended claims.

Although the invention is illustrated and described herein as embodied in a method and an apparatus for adding a reactant to an exhaust gas from an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a diagrammatic, cross-sectional view through a second exemplary embodiment of the apparatus according to the invention; and FIG. 4 is a diagrammatic, cross-sectional view through an excerpt from a cross section through a third exemplary embodiment of the apparatus according to the invention.

DESCRIPTION OF THE PREFERRED EMBODIMENTS

Figure 1:
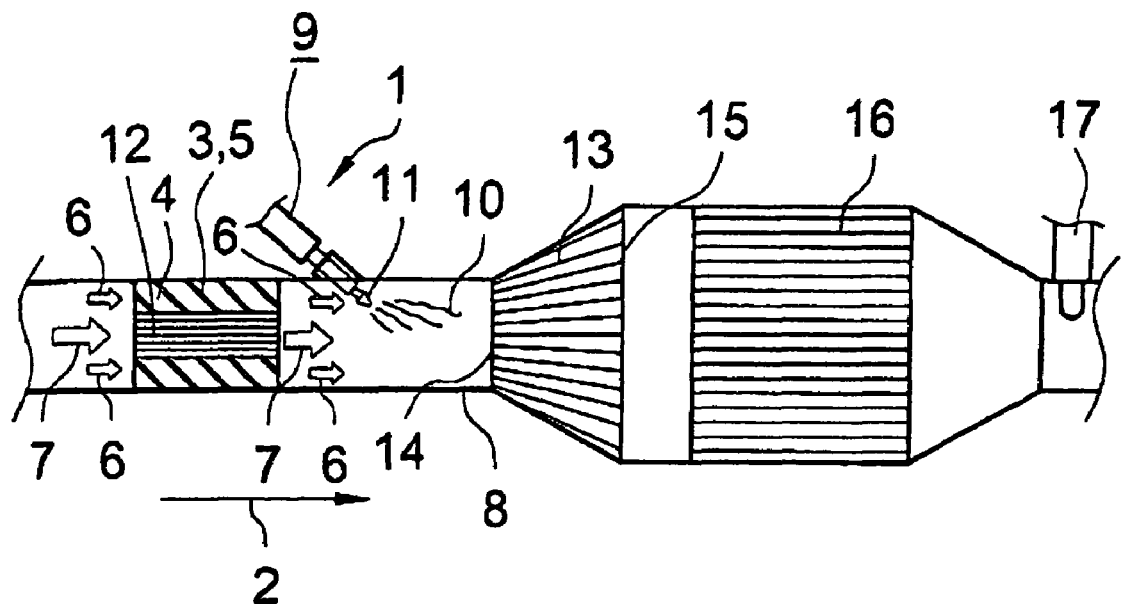
FIG. 1 is a diagrammatic, longitudinal sectional view through a first exemplary embodiment of an apparatus according to the invention.

Referring now to the figures of the drawing in detail and first, particularly, to FIG. 1 thereof, there is shown diagrammatically an apparatus 1 according to the invention for adding a reactant to an exhaust gas from a non-illustrated internal combustion engine. The exhaust gas from the internal combustion engine flows through the apparatus 1 in a direction of flow 2. The apparatus 1 contains a device 3 for imparting a swirl. In the first exemplary embodiment of the present invention, the device 3 for imparting the swirl is configured in the form of a winding passage 4 which is delimited by a correspondingly winding wall 5. In the present exemplary embodiment, the winding passage 4 has a worm-like form. The device 3 for imparting the swirl imparts a swirl to an outer exhaust gas flow 6. The latter surrounds an inner exhaust gas flow 7. The swirl imparted to the outer exhaust gas flow 6 leads to the formation of an outer exhaust gas flow 6 with a swirling flow which radially surrounds the inner exhaust gas flow 7 and protects the inner exhaust gas flow 7 from coming into contact with a wall of a tubular casing 8. An addition device 9 for adding a reactant 10 to the inner exhaust gas flow 7 is formed downstream of the device 3 for imparting the swirl, as seen in the direction of flow 2.

The reactant 10 added is particularly preferably urea, in particular in the form of an aqueous urea solution. Urea represents a reducing agent precursor of the reducing agent ammonia, which is used as a reducing agent for example in the selective catalytic reduction of nitrogen oxides. In the present context, a reducing agent precursor is to be understood in particular as meaning a substance which can react to form the reducing agent and/or can release the reducing agent. In the present case, the addition device 9 contains a nozzle 11, through which the reactant 10 is introduced into the inner exhaust gas flow 7. The addition device 9 also contains a corresponding supply, such as for example a storage tank, and/or delivery device, such as for example a pump.

The inner exhaust gas flow 7 is additionally laminarized by a laminarization device 12. In this context, the term laminarization is to be understood in particular as meaning a reduction in the Reynolds number of the flow. The laminarization device 12 contains a honeycomb body as explained in more detail in connection in particular with FIGS. 3 and 4. The laminarization of the inner exhaust gas flow 7 further reduces the probability of the reactant 10 coming into contact with the inner surface of the first tubular casing 8. If a drop of the reactant were to come into contact with the first tubular casing 8, undesirable by-products could be formed from the reactant 10 if the temperature of the first tubular casing 8 is below a critical temperature. In particular if the reactant 10 used is urea, contact between urea and the first tubular casing 8 can lead to the formation of undesirable by-products, such as for example biuret. Biuret is a viscous substance, which can usually only be removed again under extreme reaction conditions, such as for example a very high pressure and a high temperature, and which has a consistency which is such that sticking of the tubular casing and in the long term also of the honeycomb bodies formed in the exhaust system could occur.

A conical honeycomb body 13, which widens the cross section through which the exhaust gas can flow from an entry cross section 14 to an exit cross section 15, is formed downstream of the addition device 9, as seen in the direction of flow 2. The conical honeycomb body 13 has passages, the cross section of which likewise widens accordingly. The walls of the passages preferably have apertures and guide vanes which allow mass transfer transversely with respect to the direction of flow 2. This leads to mixing between the outer exhaust gas flow 6 and the inner exhaust gas flow 7.

The conical honeycomb body 13 has a catalytically active coating which catalyzes hydrolysis of the urea. This leads to the urea being converted into ammonia. On account of its ability to permit a certain flow transversely to the direction of flow 2, the conical honeycomb body 13 effects a uniform distribution of the reducing agent urea which is then formed over the entire cross section of the exhaust gas flow. A reduction catalytic converter 16 is formed downstream of the conical honeycomb body 13. The reduction catalytic converter 16 contains a honeycomb body with a catalytically active coating which catalyzes selective catalytic reduction of nitrogen oxides. Since an exhaust gas flow in which the reducing agent is distributed uniformly flows to the reduction catalytic converter 16, the nitrogen oxides are effectively converted in the reduction catalytic converter 16.

A nitrogen oxide concentration sensor 17, which can be used to measure the nitrogen oxide concentration in the exhaust gas leaving the reduction catalytic converter 16, is formed downstream of the reduction catalytic converter 16, as seen in the direction of flow 2. The quantity of reactant added can be controlled as a function of the measured values from the nitrogen oxide concentration sensor 17, so as to convert the nitrogen oxides ($NO_x$) that are present in the exhaust gas as completely as possible.

Figure 2:
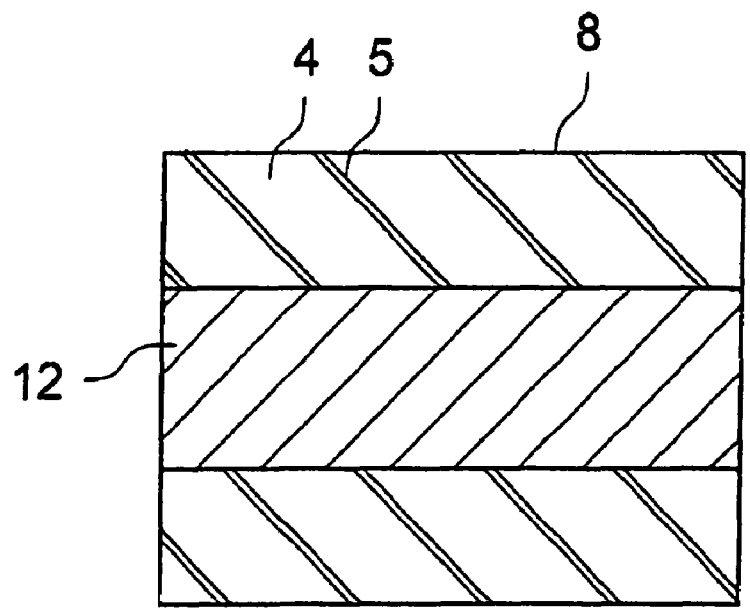
FIG. 2 is a diagrammatic, longitudinal sectional view through part of the first exemplary embodiment of the apparatus according to the invention.

FIG. 2 diagrammatically depicts an excerpt from the apparatus 1 according to the invention. The apparatus contains the laminarization device 12 and also, as the device 3 for imparting the swirl, the winding passage 4, which is delimited by the winding wall 5. A swirl is imparted to the outer exhaust gas flow 6, which flows through the winding passage 4. The laminarization device 12 laminarizes the inner exhaust gas flow 7. After it has left the laminarization device 12 or the winding passage 4, the reactant 10 is added to the inner exhaust gas flow 7, for which the outer exhaust gas flow 6, which has been provided with a swirl, serves as a type of insulation preventing the reactant 10 from coming into contact with the first tubular casing 8.

FIG. 3 diagrammatically depicts a cross section through a second exemplary embodiment of an apparatus 1 according to the invention. In the present cross section, the apparatus 1 contains the laminarization device 12, which is formed as a honeycomb body 18. In the present second exemplary embodiment, the honeycomb body 18 is formed from at least partially corrugated layers 19 and substantially smooth layers 20. The layers 19, 20 are formed from metallic material, in particular in the form of sheet-metal foils. The layers 19, 20 have been deformed in such a way that passages 21 are formed between the at least partially corrugated layers 19 and the substantially smooth layers 20. In the present exemplary embodiment, for this purpose a plurality of layers 19, 20 were stacked alternately and then three such stacks were intertwined with one another. It is also possible to intertwine just two stacks or even just one such stack; moreover, it is also possible for corresponding layers 19, 20 to be wound up helically.

In the present second exemplary embodiment, the device 3 for imparting a swirl are configured in the form of guide vanes 22 which are formed radially outside the honeycomb body 18. The guide vanes 22 are configured in such a way that they impart a swirl to the outer exhaust gas flow 6. In particular the guide vanes 22 and/or the winding walls 5 of the winding passage 4 may be elastic in form. It is preferable for these elements 4, 22 to be formed in such a way that they alter their curvature or deflection as a function of a change in at least one of the following variables: the exhaust gas temperature, the exhaust gas mass flow and the exhaust gas pressure. This can take place, for example, by the winding wall 5 and/or the guide vanes 22 being formed from a bimetal or from an elastic metal. As a result, the imparted swirl can be adapted to the conditions of the exhaust gas flow.

The honeycomb body 18 is in particular formed in such a way that it leads to a reduction in the Reynolds number of the exhaust gas stream. For this purpose, the passages 21 are preferably of barrier-free configuration, i.e. the surfaces of the substantially smooth layer 20 and of the at least partially corrugated layer 19 in particular do not have any microstructures, guide vanes and/or apertures and preferably also do not have any catalytically active coating, so that the formation of a turbulence during flow through the passages 21 is avoided as far as possible.

In the present exemplary embodiment, the honeycomb body 18 has a second tubular casing 23, which delimits the honeycomb body 18 on the outer side. The guide vanes 22 at the same time form measures for shifting the resonant frequency of the second tubular casing 23, i.e. the second tubular casing 23 is secured to the first tubular casing 8 via the guide vanes 22. This advantageously prevents the honeycomb body 18 from being damaged when a resonant frequency of the second tubular casing 23 is reached. In the present exemplary embodiment, the addition device 9 do not lie in this cross section, but rather are located downstream of the honeycomb body 18, as seen in the direction of flow 2. As exhaust gas flows through it, the second tubular casing 23 is responsible for dividing the exhaust gas stream into the inner exhaust gas flow 7 and the outer exhaust gas flow 6.

FIG. 4 diagrammatically depicts an excerpt from a cross section through a third exemplary embodiment of the apparatus 1 according to the invention. This apparatus, instead of a metallic honeycomb body, contains a ceramic honeycomb body 18. The latter has walls 24 delimiting passages 21. A ceramic honeycomb body 18 of this type may preferably be extruded. In this exemplary embodiment too, the honeycomb body 18 has a second tubular casing 23 as well as guide vanes 22 for imparting a swirl to an outer exhaust gas flow 6. In the third exemplary embodiment, the first tubular casing 8 is formed as a double tubular casing having an inner first tubular casing 25 and an outer first tubular casing 26. The two first tubular casings 25, 26 are separated from one another by a gap 27. This gap 27 acts as a type of air gap insulation which prevents rapid cooling of the inner first tubular casing 25. It is preferable for the inner first tubular casing 25 to be formed from a material which heats up quickly, so that there can be no formation of undesirable by-products, such as in particular biuret, even if reactant 10 can pass through the outer gas stream 6. To further reduce the probability of undesirable by-products being formed, in the third exemplary embodiment a catalytically active coating 28, which is formed in particular as a hydrolysis catalyst coating for urea, is formed in the interior of the inner first tubular casing 25. As a result, the reactant 10 can advantageously be converted directly, so that as a result the probability of undesirable by-products being formed on the tubular casing 8, 25 is reduced still further. Moreover, the third exemplary embodiment has an additional supporting device 29 which support the second tubular casing on the inner first tubular casing 25.

The method according to the invention and the apparatus 1 according to the invention advantageously allow the reactant 10, in particular a reducing agent precursor and/or a reducing agent, preferably urea, in particular in aqueous solution, to be introduced into the exhaust system of an internal combustion engine, without undesirable by-products, such as for example biuret, being formed as a result of the reactant 10 coming into contact with the usually relatively cool outer tubular casing 8, 25 of the apparatus 1.

This application claims the priority, under 35 U.S.C. § 119, of German application DE 10 2005 041 841.4, filed Sep. 2, 2005, the prior application is herewith incorporated by reference in its entirety.

I claim:

1. A method for adding a reactant to an exhaust gas from an internal combustion engine, which comprises the steps of:
   dividing an exhaust gas stream into an inner exhaust gas flow and an outer exhaust gas flow radially surrounding the inner exhaust gas flow;
   imparting a swirl to the outer exhaust gas flow;
   laminarizing the inner exhaust gas flow with a laminarization device disposed upstream of an addition device;
   subsequent to imparting the swirl to the outer gas flow and laminarizing the inner gas flow, guiding the inner exhaust gas flow and the outer exhaust gas flow to a common tubular casing; and
   adding the reactant to the inner exhaust gas flow at the common tubular casing.

2. The method according to claim 1, which further comprises forming the reactant to contain at least one substance selected from the group consisting of a reducing agent, a reducing agent precursor, and an oxidizing agent.

3. An apparatus for adding a reactant to an exhaust gas from an internal combustion engine flowing in a direction of flow, the apparatus comprising:
   a device for imparting a swirl to an outer exhaust gas flow radially surrounding an inner exhaust gas flow;
   a laminarization device for laminarizing the inner exhaust gas flow;

a common tubular casing disposed downstream of said device for imparting a swirl, as seen in the direction of flow, said common tubular casing guiding the inner exhaust gas flow and the outer exhaust; and an addition device for adding the reactant to the inner exhaust gas flow and said addition device being formed at said common tubular casing and downstream of said device for imparting the swirl and downstream of said laminarization device, as seen in the direction of flow.

4. The apparatus according to claim 3, wherein said device for imparting the swirl contains at least one winding passage.

5. The apparatus according to claim 3, wherein said device for imparting the swirl is formed radially outside said laminarizing device.

6. The apparatus according to claim 3, wherein said reactant contains at least one substance selected from the group consisting of a reducing agent, and a reducing agent precursor.

7. The apparatus according to claim 3, wherein said device for imparting the swirl contains at least one guide vane.

8. The apparatus according to claim 7, wherein said at least one guide vane is formed such that at least one of a deflection of said guide vane and/or a curvature of said guide vane can be altered in dependence on a change in at least one of:

an exhaust gas temperature, an exhaust gas mass flow, and an exhaust gas pressure.

* * * * *